(12) United States Patent
Bohanan et al.

(10) Patent No.: US 11,091,274 B2
(45) Date of Patent: Aug. 17, 2021

(54) AIRCRAFT FLIGHT GUIDANCE PANELS WITH INTEGRATED STANDBY DISPLAYS

(71) Applicant: Gulfstream Aerospace Corporation, Savannah, GA (US)

(72) Inventors: Scott Bohanan, Savannah, GA (US); Jeffrey Good, Savannah, GA (US); Jim Jordan, Savannah, GA (US); Ozan Ates, Savannah, GA (US); Kristin Medin, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 649 days.

(21) Appl. No.: 15/977,963

(22) Filed: May 11, 2018

(65) Prior Publication Data
US 2019/0344903 A1 Nov. 14, 2019

(51) Int. Cl.
*B64D 43/02* (2006.01)
*G01C 23/00* (2006.01)
*B64D 43/00* (2006.01)

(52) U.S. Cl.
CPC ........... *B64D 43/02* (2013.01); *G01C 23/005* (2013.01); *B60K 2370/1438* (2019.05)

(58) Field of Classification Search
USPC ....................................................... 701/120
See application file for complete search history.

(56) References Cited

U.S. PATENT DOCUMENTS

| 2006/0164260 A1* | 7/2006 | Berthou | G01C 23/005 340/945 |
| 2007/0008188 A1* | 1/2007 | Firra | G01D 7/002 340/973 |
| 2008/0001847 A1* | 1/2008 | Kratchounova | G01C 23/00 345/1.1 |
| 2008/0012730 A1* | 1/2008 | Soler | G01C 23/00 340/973 |
| 2009/0112380 A1 | 4/2009 | Nutaro et al. | |
| 2010/0116842 A1 | 5/2010 | Hecht et al. | |

(Continued)

FOREIGN PATENT DOCUMENTS

FR 2999153 A1 6/2014

OTHER PUBLICATIONS

United States Patent and Trademark Office, Final Office Action in U.S. Appl. No. 15/453,005, dated Nov. 9, 2018.

*Primary Examiner* — Tyler D Paige
(74) *Attorney, Agent, or Firm* — LKGlobal | Lorenz & Kopf, LLP

(57) ABSTRACT

A flight guidance panel includes a housing, a first flight guidance display, a second flight guidance display, a standby display, and a controller. The housing defines a first longitudinal side and a second longitudinal side. The first flight guidance display is disposed in the first longitudinal side of the housing and the second flight guidance display is disposed in the second longitudinal side of the housing. The standby display is disposed between the first flight guidance display and the second flight guidance display. The controller is configured for generating at least one functional panel indicating flight parameters on the first flight guidance display and on the second flight guidance display. The controller is further configured for generating standby flight information for presentation on the standby display.

20 Claims, 1 Drawing Sheet

(56) References Cited

U.S. PATENT DOCUMENTS

| | | | |
|---|---|---|---|
| 2012/0256768 A1* | 10/2012 | Kratchounova | H04N 13/349 |
| | | | 340/973 |
| 2014/0074324 A1 | 3/2014 | Burgin | |
| 2014/0074325 A1* | 3/2014 | Nikolic | G01C 23/005 |
| | | | 701/14 |
| 2016/0185448 A1 | 6/2016 | Scacchi et al. | |
| 2017/0355467 A1* | 12/2017 | Rudolph | B64C 13/18 |
| 2019/0344903 A1* | 11/2019 | Bohanan | G01C 23/00 |

* cited by examiner

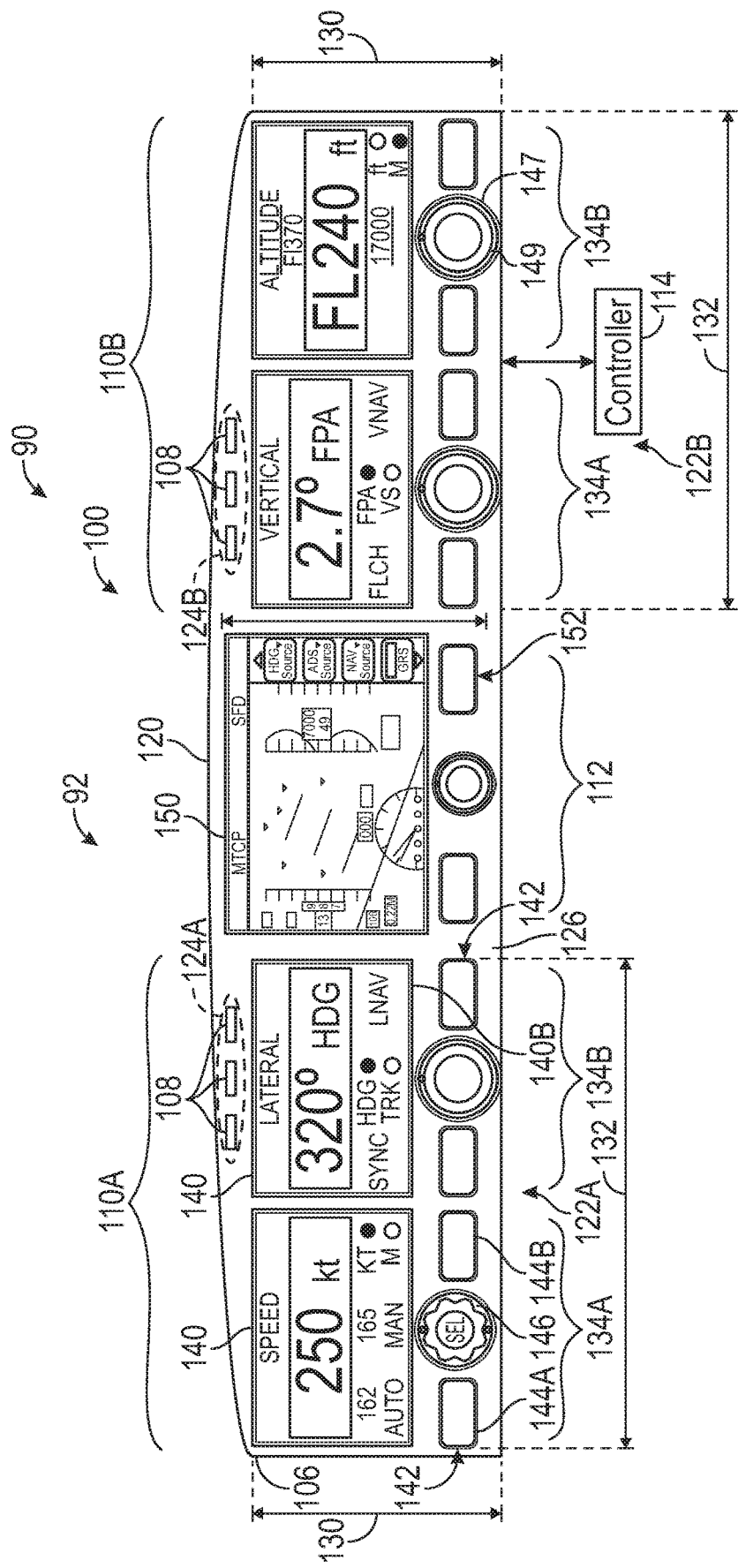

AIRCRAFT FLIGHT GUIDANCE PANELS WITH INTEGRATED STANDBY DISPLAYS

TECHNICAL FIELD

The present invention generally relates to aircraft avionics, and more particularly relates to flight guidance panels with integrated standby displays.

BACKGROUND

Conventional transport category flight guidance panels are primarily implemented in hardware. Knobs and buttons control specific functions and the labels are stenciled on the panel itself. Annunciations are provided using lamps or lights. Selections are typically displayed using numerical readouts and seven segment displays.

Flight decks in these conventional transport category aircraft typically include a standby display to each side of the flight guidance panel. The standby display presents flight information that may be used to fly the aircraft in the event of failure of the primary flight displays. The flight guidance panel and two standby displays are suitable for their intended purposes, but there is room for improvement.

Accordingly, it is desirable for this disclosure to provide advanced aircraft and systems for flight guidance panels. Furthermore, other desirable features and parameters of the present invention will become apparent from the subsequent detailed description of the invention and the appended claims, taken in conjunction with the accompanying drawings and this background of the invention.

BRIEF SUMMARY

Various non-limiting embodiments of flight guidance panels and aircraft are disclosed herein.

In a first non-limiting embodiment, a flight guidance panel includes a housing, a first flight guidance display, a second flight guidance display, a standby display, and a controller. The housing defines a first longitudinal side and a second longitudinal side. The first flight guidance display is disposed in the first longitudinal side of the housing and the second flight guidance display is disposed in the second longitudinal side of the housing. The standby display is disposed between the first flight guidance display and the second flight guidance display. The controller is configured for generating at least one functional panel indicating flight parameters on the first flight guidance display and on the second flight guidance display. The controller is further configured for generating standby flight information for presentation on the standby display.

In a second non-limiting embodiment, an aircraft includes a flight guidance panel. The flight guidance panel includes a housing, a first flight guidance display, a second flight guidance display, a standby display, and a controller. The housing defines a first lateral side and a second longitudinal side. The first flight guidance display is disposed in the first longitudinal side of the housing and the second flight guidance display is disposed in the second longitudinal side of the housing. The standby display is disposed between the first flight guidance display and the second flight guidance display. The controller is configured for generating at least one functional panel indicating flight parameters on the first flight guidance display and on the second flight guidance display. The controller is further configured for generating standby flight information for presentation on the standby display.

BRIEF DESCRIPTION OF THE DRAWINGS

The present invention will hereinafter be described in conjunction with the following drawing FIGURES, wherein like numerals denote like elements, and FIG. 1 is a simplified schematic view illustrating a non-limiting embodiment of an aircraft flight deck with a flight guidance panel in accordance with the teachings of the present disclosure.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Flight Guidance Panels (FGPs) described herein generally include two functional panels to each side of a standby display. A flight deck in which the FGP is located may therefore omit the conventional standby display units located to each side of a conventional FGP. The functional panels and the standby display may be combined into a single line replaceable unit (LRU) thus reducing overall size, reduced power consumption, increasing reliability, and at significantly lower cost than conventional flight decks with three separate LRUs for a conventional flight guidance panel and two conventional standby displays. Furthermore, the combined FGP with standby display requires less space than the conventional FGP and standby displays. Accordingly, the combined FGP and standby unit may free up additional space for other displays or better visibility through the windshield. In some embodiments, the center screen has redundant power inputs and control inputs and outputs for increased reliability. In some embodiments, each screen of the FGP is touch capable.

In the example provided, the standby display is larger than the functional panels so that the housing of the FGP may taper down at end portions to provide more visibility through a windshield of the aircraft while still presenting large and legible standby flight information. In some embodiments, color displays also are utilized to explicitly communicate the state of the FGP to the flight crew. Although the FGP is discussed herein as a component of an aircraft, the configurations and algorithms described for operation of the FGP may be applicable to other vehicles, such as watercraft or automobiles.

FIG. 1 is schematic view illustrating a non-limiting embodiment of a flight deck 90 of an aircraft with a windshield 92 and a flight guidance panel (FGP) 100 in accordance with teachings of the present disclosure. Windshield 92 is a clear material through which pilots in the flight deck may view the surroundings of the vehicle, as will be appreciated by those with ordinary skill in the art. FGP 100 includes a housing 106, user interface sensors 108, a first flight guidance display 110A, a second flight guidance display 110B, a standby display 112, and a controller 114. In the example provided, user interface sensors 108, first flight guidance display 110A, second flight guidance display 110B, and standby display 112 are components of a single Line Replaceable Unit (LRU).

Housing 106 defines an upper edge 120, a first longitudinal side 122A, a second longitudinal side 122B, and includes a front wall 126. Upper edge 120 tapers downward from a longitudinally centered apex of the housing to longitudinal ends of the housing at first longitudinal side 122A and second longitudinal side 122B. The taper from a tall center to shorter ends accommodates a first sensor portion 124A and a second sensor portion 124B defined by front wall 126, as will be described below. In the example provided, first longitudinal side 122A is on a left side of flight deck 90 closer to a pilot of the aircraft and second longitudinal side 122B is on a right side of flight deck 90 closer to a co-pilot of the aircraft. As used herein, the "longitudinal" dimension is the width dimension of the FGP as viewed by a pilot or co-pilot when the FGP is installed in flight deck 90.

First sensor portion 124A is disposed substantially directly vertically above first flight guidance display 110A and substantially directly laterally adjacent to standby display 112. Second sensor portion 124B is disposed substantially directly vertically above second flight guidance display 110B and substantially directly laterally adjacent to standby display 112. In the example provided, standby display 120 is taller than flight guidance displays 110A-B to accommodate sensor portions 124A-B below upper edge 120 and above flight guidance displays 110B. As used herein, the terms "substantially directly laterally adjacent" and "substantially directly vertically above" require at least some overlapping alignment between sensor portions 124A-B and the respective displays 110A-B and 112.

User interface sensors 108 are configured to determine when an object is proximate flight guidance panel 100. For example, user interface sensors 108 may include capacitive sensors, beam breaker sensors, infrared thermal sensors, or the like to determine when an object—such as a crew members hand—is approaching or is near flight guidance panel 100. In the example provided, user interface sensors 108 are disposed in first sensor portion 124A and second sensor portion 124B. In some embodiments, interface sensors 108 are disposed in other portions of FGP 100. In some embodiments, interface sensors 108 are disposed in other portions of flight deck 90. In some embodiments, user interface sensors 108 are omitted.

First flight guidance display 110A is disposed in first longitudinal side 122A of housing 106. First flight guidance display 110A has a guidance vertical dimension 130 and a guidance horizontal dimension 132. In the example provided, guidance horizontal dimension 132 is larger than guidance vertical dimension 130. In other words, first flight guidance display 110A is wider than it is tall. In some embodiments, flight guidance display 110A has other shapes and form factors.

First flight guidance display 110A includes a first functional unit 134A and a second functional unit 134B. Functional units 134A-B are each associated with a navigational parameter of flight, such as airspeed, heading, flight path, course, vertical speed, altitude, or other parameters typically associated with flight guidance panels. As used herein, the term "flight parameter" refers to a value quantifying the movement of an aircraft and that may be controlled or managed by an auto throttle, autopilot, or other control automation of the aircraft. In general, each functional unit presents a target value for the flight parameter and selectors for changing which aircraft mode is active in FGP 100.

As used herein, the term "functional unit" means a portion of FGP 100 that includes only information that is related to the flight parameter and aircraft modes that may manage the flight parameter. In the example provided, first functional unit 134A of first flight guidance display 110A is associated with speed guidance and second functional unit 134B of first flight guidance display 110A is associated with lateral guidance. In some embodiments, different flight parameters may be associated with functional units 134A-B.

First functional unit 134A includes a guidance screen 140 and a guidance user input interface 142. In the example provided, guidance screen 140 is sunlight readable, is full color, has sufficient resolution to clearly render text and graphics or symbology when the flight crew is seated at design eye, and features power and display driver redundancy to provide robust availability. For example, guidance screen 140 may be implemented as organic light emitting diode (OLED) panels, light emitting diode (LED) panels, or any other suitable display technology.

Guidance user input interface 142 includes a first button 144A, a second button 144B, and a knob 146. Buttons 144A-B may be used to make selections presented on guidance screen 140 and knob 146 may be used to make selections and change targets of the respective navigation parameter. In the example provided, guidance user input interface 142 is disposed directly beneath guidance screen 140 and knob 146 is disposed between first button 144A and second button 144B. It should be appreciated that other button and knob configurations may be utilized without departing from the scope of the present disclosure. In some embodiments, guidance user input interface 142 may include switches, touchscreen controls, or other devices for physical interaction with crew members of the aircraft.

The function of buttons 144A-B and knobs 146 are determined by controller 114. In some embodiments, controller 114 is configured for changing a target of the flight parameter in response to rotation of the hardware knob. In the example provided, rotating a knob counterclockwise reduces the value the knob is controlling and rotating a knob clockwise increases the value the knob is controlling. The center of each knob can be depressed to select a center selection on the respective screen.

Knobs 146 each include an outer component 147 and an inner component 149. Inner component 149 and outer component 147 are coaxially aligned and outer component 147 circumscribes inner component 149. Inner component 149 and outer component 147 are rotatable and are associated with optical rotary encoders to provide rotational position information to controller 114. Controller 114 is configured to adjust flight parameter values of a selected functional panel at a first increment in response to rotation of outer component 147 and at a second increment in response to rotation of inner component 149. For example, when the selected functional panel is a lateral panel, outer component 147 may change the heading value by ten degrees per rotational increment, while inner component 149 may change the heading value by one degree per rotational increment. In some embodiments, controller 114 changes the parameter values based on a speed of rotation of the components 147 and 149. For example, controller 114 may quicken parameter changes based on a fast rotation of knob 146. It should be appreciated that other increments may be utilized without departing from the scope of the present disclosure.

Second functional unit 134B is similar to first functional unit 134, where like numbers refer to like components. Second functional unit 134B, however, is adjacent to first functional unit 134A and is associated with a different flight parameter.

Second flight guidance display 110B is similar to flight guidance display 110A, where like numbers refer to like components. Second flight guidance display 110B, however, is disposed in second longitudinal side 122B of housing 106 and functional units 134A-B are associated with different flight parameters. In the example provided, first functional unit 134A of second flight guidance display 110B is associated with vertical guidance and second functional unit 134B of second flight guidance display 110B is associated with altitude guidance. In some embodiments, different flight parameters may be associated with functional units 134A-B. In some embodiments, second flight guidance display 110B may have dimensions and form factors that are different from those of first flight guidance display 110A.

Standby display 112 is disposed between first flight guidance display 110A and second flight guidance display 110B. In the example provided, standby display 112 is composed of a standby screen 150 and a standby user input interface 152. Standby screen 150 is similar to guidance screen 140, but is larger than guidance screen 140. In the example provided, standby user input interface 152 is similar to guidance user input interface 142, but with different sizing and spacing of input devices. Standby display 112 presents standby flight data, as will be described below. Standby display 112 has a standby vertical dimension that is larger than guidance vertical dimension 130 of guidance displays 110A-B. In the example provided, standby display 112 extends vertically above first flight guidance display 110A and second flight guidance display 110B.

Controller 114 is a hardware device that carries out instructions of a computer program to perform the functions of FGP 100. Controller 114 is a special purpose computer configured to execute the computer program to provide the functions described herein. Controller 114 includes one or more memory units that store electronic data and computer programs. For example, the memory units may be flash memory, spin-transfer torque random access memory (STT-RAM), magnetic memory, phase-change memory (PCM), dynamic random access memory (DRAM), or other suitable electronic storage media. In the example provided, the memory units store control logic with instructions that cooperate with a processor of controller 114 to perform operations of the method described below. In some embodiments, the processor may include one or more central processing units ("CPUs"), a microprocessor, an application specific integrated circuit ("ASIC"), a microcontroller, a Field Programmable Gate Array (FPGA), and/or other suitable device. Furthermore, controller 114 may utilize multiple hardware devices communicating across a data bus or buses, as is also appreciated by those of ordinary skill in the art.

Controller 114 is configured to provide the functions associated with a flight guidance panel in addition to the specific features of a standby display. In general, controller 114 receives inputs, calculates instructions, and generates instructions for display, and generate aircraft control information on the bus or buses. 110A-B and 112 to present information related to the state of the aircraft.

Controller 114 is configured for generating at least one functional panel indicating flight parameters on the first flight guidance display and on the second flight guidance display. As used herein, the term "functional panel" refers to the rendered graphics and text that form the visual portion of the respective screen. For example, the functional units 134A-B are associated with parameters that are visually presented by functional panels generated on guidance screens 140.

Controller 114 is further configured for generating standby flight information for presentation on the standby display. In the example provided, the standby flight information includes airspeed, attitude, altitude, heading, navigation, and flight director information. In some embodiments, standby flight information includes every piece of information required by government regulations in various countries. In the example provided, controller 114 continuously generates the standby flight information for presentation, even if standby display 112 is in a different mode to present different information.

Controller 114 is further configured to utilize standby display 112 to interface with various aircraft systems. For example, standby display 112 may be utilized for crew members to change settings of an Electronic Display System (EDS), a Weather Radar System (WX), a Central Maintenance Computer (CMC), an Attitude Heading Reference System (AHRS), an Inertial Reference Unit (IRU), an Onboard Navigation Sensor, a Fuel Quantity Management System (FQMS), a Fluid Quantity Indicator (FQI), a Cabin Pressure Control System (CPCS), a Full Authority Digital Engine Control (FADEC) System, a Traffic Collision Avoidance System (TCAS), Radio Altimeters, Crew Alert System (CAS), and Tire Pressure Monitoring System (TPMS). In some embodiments, standby display 112 is used to interface with other systems of the aircraft.

Controller 114 is further configured to declutter at least one of the standby display, the first flight guidance display, and the second flight guidance display in response to determining that the object is not proximate to the flight guidance panel. As discussed above, the object may be a crew member's finger or hand. For example, when sensors 108 detect a pilot's finger approaching FGP 100, controller 114 may present various menus, button labels, and other interaction specific details on displays 110A-B and 112. When sensors 108 do not detect the pilot's finger near FGP 100, controller 114 may "declutter" displays 110A-B and 112 by not presenting the menus, button labels, and other interaction specific details on displays 110A-B and 112.

Controller 114 is further configured to define the function of various hardware buttons and knobs of displays 110A-B and 112 as well as to cause displays 110A-B and 112 to present labels for various hardware buttons that are assigned functions. In the example provided, the function labels for the various hardware buttons are displayed proximate to and immediately adjacent to the respective button, either above or below the button based on button location.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A flight guidance panel for an aircraft, the flight guidance panel comprising:
   a housing defining a first longitudinal side and a second longitudinal side;
   a first flight guidance display disposed in the first longitudinal side of the housing;
   a second flight guidance display disposed in the second longitudinal side of the housing;
   a standby display disposed between the first flight guidance display and the second flight guidance display; and
   a controller configured for:

generating at least one functional panel indicating flight parameters on the first flight guidance display and on the second flight guidance display; and generating standby flight information for presentation on the standby display.

2. The flight guidance panel of claim 1, wherein the standby display has a standby vertical dimension, the first flight guidance display has a first vertical dimension, and the second flight guidance display has a second vertical dimension, wherein the standby vertical dimension is larger than the first vertical dimension and the second vertical dimension.

3. The flight guidance panel of claim 2, wherein the first flight guidance display has a first horizontal dimension that is larger than the first vertical dimension and the second flight guidance display has a second horizontal dimension that is larger than the second vertical dimension.

4. The flight guidance panel of claim 1, wherein the first flight guidance display, the second flight guidance display, and the standby display are components of a single Line Replaceable Unit.

5. The flight guidance panel of claim 1, wherein the housing includes an upper edge that tapers downward from a longitudinally centered apex of the housing to longitudinal ends of the housing.

6. The flight guidance panel of claim 1, further comprising user interface sensors configured to determine when an object is proximate the flight guidance panel, and wherein the controller is further configured to declutter at least one of the standby display, the first flight guidance display, and the second flight guidance display in response to determining that the object is not proximate the flight guidance panel.

7. The flight guidance panel of claim 6, wherein the standby display extends vertically above the first flight guidance display and the second flight guidance display, the housing includes a front wall defining a first sensor portion and a second sensor portion, the first sensor portion disposed substantially directly vertically above the first flight guidance display and substantially directly laterally adjacent to the standby display, the second sensor portion disposed substantially directly vertically above the second flight guidance display and substantially directly adjacent to the standby display, and wherein the user interface sensors are disposed in the first sensor portion and the second sensor portion.

8. The flight guidance panel of claim 1, wherein the standby display is composed of a standby screen and a standby user input interface.

9. The flight guidance panel of claim 8, wherein the first flight guidance display and the second flight guidance display each include a first screen, a second screen, a first guidance user input interface associated with the first screen, and a second guidance user input interface associated with the second screen.

10. The flight guidance panel of claim 1, wherein the controller is configured for generating airspeed, attitude, altitude, heading, navigation, and flight director information as the standby flight information.

11. An aircraft, comprising:
a flight guidance panel comprising:
a housing defining a first longitudinal side and a second longitudinal side;
a first flight guidance display disposed in the first longitudinal side of the housing;
a second flight guidance display disposed in the second longitudinal side of the housing;
a standby display disposed between the first flight guidance display and the second flight guidance display; and
a controller configured for:
generating at least one functional panel indicating flight parameters on the first flight guidance display and on the second flight guidance display; and
generating standby flight information for presentation on the standby display.

12. The aircraft of claim 11, wherein the standby display has a standby vertical dimension, the first flight guidance display has a first vertical dimension, and the second flight guidance display has a second vertical dimension, wherein the standby vertical dimension is larger than the first vertical dimension and the second vertical dimension.

13. The aircraft of claim 12, wherein the first flight guidance display has a first horizontal dimension that is larger than the first vertical dimension and the second flight guidance display has a second horizontal dimension that is larger than the second vertical dimension.

14. The aircraft of claim 11, wherein the first flight guidance display, the second flight guidance display, and the standby display are components of a single Line Replaceable Unit.

15. The aircraft of claim 11, wherein the housing includes an upper edge that tapers downward from a longitudinally centered apex of the housing to longitudinal ends of the housing.

16. The aircraft of claim 11, wherein the flight guidance panel further comprises user interface sensors configured to determine when an object is proximate the flight guidance panel, and wherein the controller is further configured to declutter at least one of the standby display, the first flight guidance display, and the second flight guidance display in response to determining that the object is not proximate the flight guidance panel.

17. The aircraft of claim 16, wherein the standby display extends vertically above the first flight guidance display and the second flight guidance display, the housing includes a front wall defining a first sensor portion and a second sensor portion, the first sensor portion disposed substantially directly vertically above the first flight guidance display and substantially directly adjacent to the standby display, the second sensor portion disposed substantially directly vertically above the second flight guidance display and substantially directly adjacent to the standby display, and wherein the user interface sensors are disposed in the first sensor portion and the second sensor portion.

18. The aircraft of claim 11, wherein the standby display is composed of a standby screen and a standby user input interface.

19. The aircraft of claim 18, wherein the first flight guidance display and the second flight guidance display each include a first screen, a second screen, a first guidance user input interface associated with the first screen, and a second guidance user input interface associated with the second screen.

20. The aircraft of claim 11, wherein the controller is configured for generating airspeed, attitude, altitude, heading, navigation, and flight director information as the standby flight information.

* * * * *